United States Patent [19]
Zeuner

[11] 3,903,919
[45] Sept. 9, 1975

[54] TWO STAGE SOLENOID OPERATED VALVE ASSEMBLY WITH RELIEF FUNCTION

[75] Inventor: Kenneth W. Zeuner, Newtown, Pa.

[73] Assignee: Control Concepts, Inc., Newtown, Pa.

[22] Filed: June 21, 1973

[21] Appl. No.: 371,996

Related U.S. Application Data

[63] Continuation-in-part of Ser. No. 245,929, April 20, 1972, Pat. No. 3,799,497.

[52] U.S. Cl. ............... 137/489; 251/30; 251/44
[51] Int. Cl. .................. F16k 31/383; F16k 31/40
[58] Field of Search ........... 137/489; 251/30, 44, 38

[56] References Cited
UNITED STATES PATENTS

| | | | |
|---|---|---|---|
| 2,654,393 | 10/1953 | Ghormley | 251/30 |
| 2,673,706 | 3/1954 | Matteson | 251/44 X |
| 2,747,606 | 5/1956 | Adams et al. | 137/489 |
| 3,100,103 | 8/1963 | Bullard | 251/38 X |
| 3,250,293 | 5/1966 | Adams et al. | 137/489 X |

FOREIGN PATENTS OR APPLICATIONS

| | | | |
|---|---|---|---|
| 1,070,896 | 12/1959 | Germany | 251/30 |

Primary Examiner—Arnold Rosenthal
Attorney, Agent, or Firm—Allan Ratner

[57] ABSTRACT

A two stage solenoid operated valve assembly having a first stage poppet movable between a valve open and a valve closed state for controlling fluid flow from the second stage under the first stage poppet. A second stage poppet has a longitudinal opening over its length and is movable between a valve open and a valve closed state to control fluid flow from an inlet to tank. An elongated tube secured to the first stage is received within the longitudinal opening of the second stage poppet and provides fluid flow from above the first poppet to tank. A range spring tends to bias the first poppet towards the closed state. With the valve assembly in its closed state, a relief function is provided when the force of fluid under the first stage poppet becomes greater than a predetermined value which may be adjusted by varying the spring force of the range spring.

11 Claims, 4 Drawing Figures

PATENTED SEP 9 1975　　3,903,919

19
3,903,919

1

TWO STAGE SOLENOID OPERATED VALVE ASSEMBLY WITH RELIEF FUNCTION

This is a continuation-in-part of application Ser. No. 245,929 filed Apr. 20, 1972 Pat. No. 3,799,497.

BACKGROUND OF THE INVENTION

A. Field of Art

This invention relates to the field of two stage solenoid operated poppet valves.

B. Prior Art

Prior two stages solenoid operated valves have had the disadvantage of requiring special ports for flow between a first stage orifice and downstream. These special porting requirements have been previously met by drilling flow channels in the valve housing. However, such channels in the housing have caused difficulty when multiple valve units are to be mounted. In addition, when valves have been made separate from the housing, such valves could not be checked out as a total unit.

SUMMARY OF THE INVENTION

A two stage solenoid operated valve assembly which provides a relief function. There is provided a first poppet movable between a valve open state and a state seating and closing a first orifice for controlling fluid flow from the second stage under the first poppet. A second poppet has a longitudinal opening over its length and controls fluid flow from an inlet to an outlet. A solenoid is effective to electromagnetically move the first poppet between the open and closed state thereby to actuate the second poppet. Flow passage means is received within the longitudinal opening of the second poppet and provides fluid flow from above the first poppet to the outlet. Range resilient means is effective to tend to bias the first poppet toward the closed state. In this manner, when the force of fluid under the first poppet is sufficient to overcome the spring force of the range spring then the first poppet opens thereby providing the relief function.

DETAILED DESCRIPTION

Figure 1:
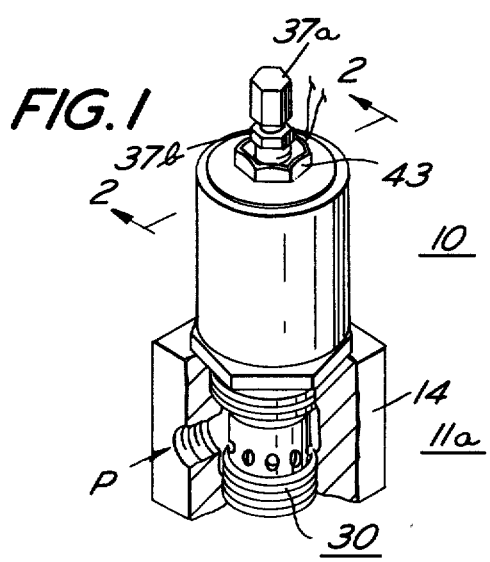
FIG. 1 is a prospective view of a two stage normally open solenoid operated valve assembly of the present invention.
Figure 2:
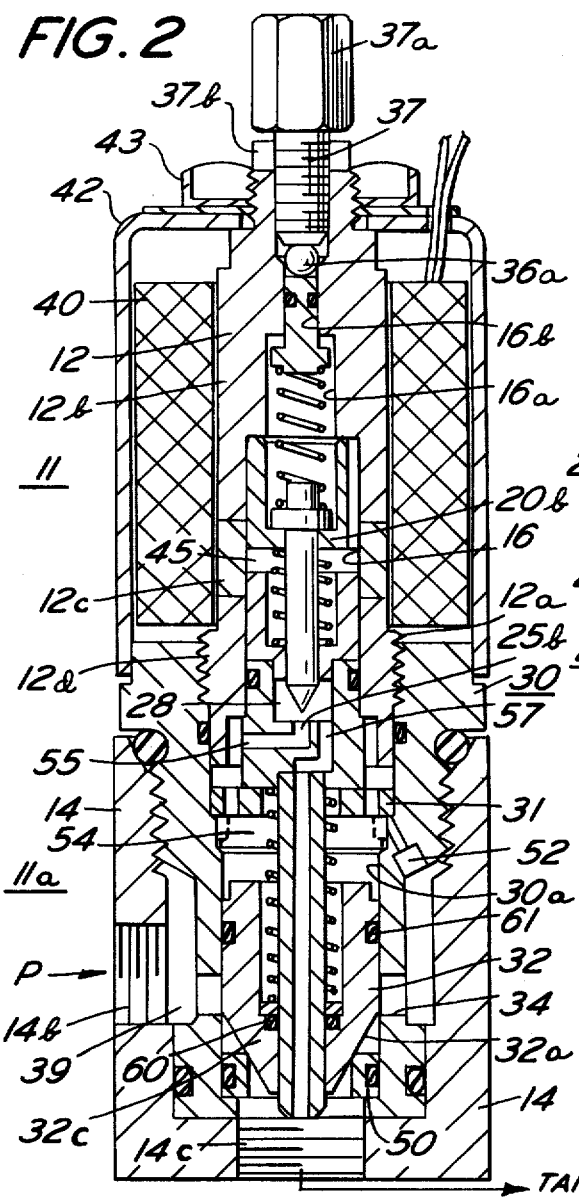
FIG. 2 is an elevational sectional view of the valve assembly of FIG. 1 taken along lines 2—2.
Figure 4:
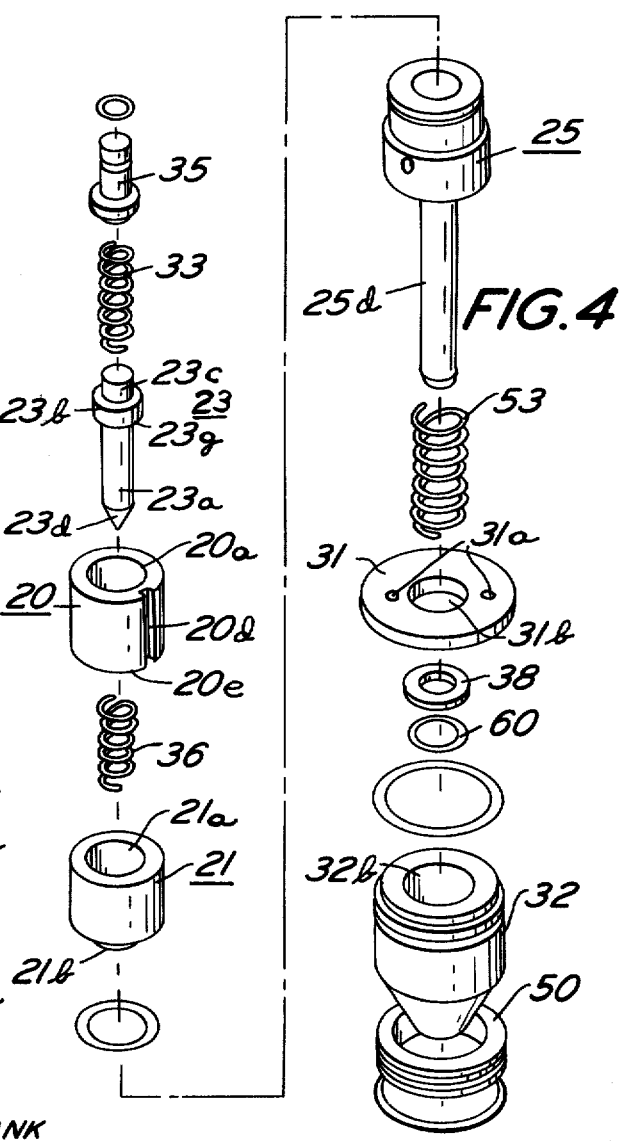
FIG. 4 is an exploded view of many of the elements of FIG. 2.

Referring now to FIGS. 1, 2 and 4, there is shown a two stage solenoid operated poppet valve 10. Valve 10 comprises a first stage 11 and a second stage 11a with fluid pressure entering a body or block 14 by way of an inlet 14b and exiting to tank by way of outlet 14c.

First stage valve assembly 11 is of the normally open poppet type and is described in detail in my copending patent application Ser. No. 370,636, now U.S. Pat. No. 3,818,927 for NORMALLY OPEN SOLENOID OPERATED VALVE ASSEMBLY WITH RELIEF FUNCTION filed June 18, 1973, now U.S. Pat. No. 3,818,927. With first stage assembly 11 normally open, the entire two stage valve assembly 10 operates normally open. However, as later described in detail with respect to FIG. 3, first stage 11 may be of the normally closed type as shown by first stage valve assembly 11c in FIG. 3.

Valve assembly 11 includes a tubular sleeve assembly 12. Assembly 12 comprises a lower sleeve section 12d, a middle sleeve section 12c and an upper sleeve section 12b. Sections 12b and d are made of a very high magnetically permeable material (ferromagnetic). Section 12c is made of a very low magnetically permeable material, such as for example, stainless steel. As shown, section 12b–d are rigidly secured together as for example by welding. Threads 12a are formed on the outer surface of section 12d with the threads engaging internal threads of plug-in valve body 30.

Sections 12b–d taken together provide an internal cylindrical chamber 16 for housing a tubular armature 20 and a tubular pole piece 21. At the top of chamber 16 there is formed a reduced inner diameter chamber 16a which terminates in a still further reduced inner diameter chamber 16b both of which are formed in sleeve section 12b remote from sections 12c–d. Armature 20 is slidably received within chamber 16 and has a cylindrical central chamber 20a and a lower reduced inner diameter section 20b. A longitudinal channel 20d is formed in the outer wall of armature 20 to allow fluid flow around the armature. Pole piece 21 has a cylindrical central chamber 21a coaxial with chamber 20a. Pole piece 21 nests in sealed relation within chamber 16.

The upper portion of armature 20 is within section 12b of chamber 16 while the lower portion thereof is within section 12c. On the other hand, the upper portion of pole piece 21 is within section 12c while the lower and major portion is within section 12d.

Secured between a reduced section 21b of pole piece 21 and a spacer 31 is a control orifice assembly 25 having a downwardly extending tube 25d within which is a central chamber 57 in fluid communication with outlet 14c. Assembly 25 has a horizontal flow channel 55 which tapers upwardly to form at its upper end a central orifice 25b which provides a seat for a poppet 23. Orifice 25b and channel 57 both open into chamber 28 of assembly 25 which is directly below section 21b.

Poppet assembly 23 is adapted to move axially within chambers 20a, 21a and 28. Poppet assembly 23 has a lower portion 23a, an intermediate or guide portion 23b and an upper portion 23c. Lower portion 23a terminates in a valve plug 23d. Guide portion 23b has sidewalls 23e which loosely fit and slide within chamber 20a. Also portion 23a loosely fits and slides within section 21b to provide alignment of the poppet into and out of orifice 25b. The loose fittings allow passage for the fluid. A lower shoulder 23g of guide 23b is engaged by reduced section 20b with valve assembly 10 in its illustrated normally open position. Section 20b has a somewhat larger inner diameter than the outer diameter of poppet portion 23a to limit contact therebetween and to further allow for fluid flow.

A range spring 33 is disposed between and engages an upper shoulder of guide 23b and the lower shoulder of an adjusting plunger 35 (later described in detail). A bias spring 36 is disposed between section 21b and an annular slot formed in a lower surface 20e of armature 20. As shown range spring (range resilient means) 33 tends to apply a bias on poppet assembly 23 pushing it towards orifice 25b. On the other hand, bias spring 36 tends to apply a compressive effect or bias on armature 20 and thus to guide 23*b* in a direction to move the poppet out of the orifice. Since bias spring 36 is selected to have a greater spring force (higher valued spring constant) than that of range spring 33, the bias spring is effective to compress the range spring, as illustrated in the normally open, deenergized state.

The spring force of range spring 33 may be adjusted by means of the up or down movement of plunger 35. Plunger 35 is received within chamber 16*b* with the upper end of the plunger engaging a steel ball 36*a*. Ball 36*a* is held in place by a set screw 37 threadedly received in chamber 16*b* and secured against rotation by a jamb nut 37*b*. The upper end of screw 37 extends out of chamber 16*b* and terminates in a head section 37*a* adapted to be manually rotated by the operator's fingers. Alternatively, screw 37 may have an upper slot 37*b* adapted to be turned by screwdriver. Accordingly, spring 33 may be adjusted in spring force by rotating screw 37 clockwise for increased spring force and counterclockwise for decreased spring force.

In second stage 11*a*, a plug-in body 30 is formed having an internal cylindrical chamber 30*a* with a second stage poppet 32 slidably received therein. An orifice assembly 50 is received within the lower end of valve body 30 for mating with valve plug 32*a* of poppet 32. Ring shaped spacer 31 is rigidly secured within a seat in chamber 30*a* and provides flow passages 31*a* and a central opening 31*b* for receiving tube 25*d* and a second stage spring 33. Tube or flow passage 25*d* is centrally received within an inner tubular opening or chamber 32*b* of poppet 32. Opening 32*b* has a section 32*c* of reduced inner diameter which together with O-ring 60 provides a fluid seal around tube 25*d*. Washer 38 is disposed around tube 25*d* to provide a seat for the lower end of spring 53, the upper end of which engages orifice assembly 25. In addition, an O-ring 61 is received within the outer surface of poppet 32 to provide a fluid seal between the outer surface and chamber 30*a*. In this manner, poppet 32 moves vertically with respect to fixed tube 25*d* with fluid seals between tube 25*d* and poppet 32 and between poppet 32 and chamber 30*a*. Valve body 30 is threadedly received within body 14.

In the normally open state, with electromagnet 40 deenergized, upstream pressure is applied to inlet 14*b* and poppets 23 and 32 are in their uppermost positions. In FIG. 2, poppet 23 is illustrated in its uppermost position while the dotted line shows the uppermost position for poppet 32. With orifice 50 fully open, upstream pressure flows directly from inlet 14*b* through channels 34 to outlet 14*c*. Spring 36 is effective to maintain poppet 23 in its uppermost position which causes poppet 32 to be in its uppermost position, for the reasons to be described.

In the normally open state, fluid flow from upstream pressure may be traced by way of inlet 14*b*, chamber 39 (around body 30), second stage pilot 52, chamber 54 (formed within chamber 30*a* and above poppet 32), flow passages 31*a*, channel 55 to orifice 25*b*. With poppet 23 open, the flow then continues through flow channel 57 which leads from the area around poppet portion 23*a* down through flow passage 25*d* and outlet 14*c*.

The pressure in chamber 54 is effective to produce a force tending to move poppet 32 downwardly. This force is equal to the pressure in the chamber times the horizontal cross-sectional area of chamber 30*a* minus tube 25*d*. On the other hand, the force tending to move poppet 32 upwardly is dependent on whether poppet 32 is closed or open. If poppet 32 is in its extreme uppermost position (dotted line position), the differential pressure between inlet 14*b* and outlet 14*c* is applied upwardly to the same horizontal cross-sectional area as the defined above. However, if poppet 32 is in its extreme lowermost position closing the orifice 50, the full line pressure is applied upwardly only to the horizontal cross-sectional area of that section of plug 32*a* that is actually exposed to the upstream pressure. In the normally open state with orifice 25*b* open, it will be understood that pilot 52 acts as a pressure divider between upstream pressure at inlet 14*b* and downstream pressure at orifice 50. Pilot 52, orifice 25*b* and the other elements are sized so that as a result of the pressure dividing action, pressure in chamber 54 does not build up sufficiently to provide a downstream force which would keep poppet 32 closed against the upstream force. Thus with orifice 25*b* open, the force tending to move poppet 32 upwardly is greater than the force tending to move it downwardly so that poppet 32 moves to its extreme uppermost position.

Upon energization of electromagnet 40, poppet 23 is moved downwardly to close the orifice 25*b*. Accordingly, the pressure in chamber 54 increases and provides a sufficient downward force on poppet 32 to close orifice 50. In view of the differences in the horizontal cross-sectional area, the downward force is greater than the upward force and is sufficient to close and maintain poppet 32 closed and seated. Upon deenergization of electromagnet 40, spring 36 is effective to push poppet 23 upwardly opening orifice 25*b*. Accordingly, the pressure in chamber 54 decreases and poppet 32 is forced upwardly opening orifice 50 for the reasons previously described. Spring 53 is a light spring and is used to overcome friction when there is no pressure applied to valve assembly 10. At that time the spring is effective to maintain poppet 32 closed against seat 50.

The detailed explanation of first stage 11 will now be set forth. A source of magnetic flux is provided by an electromagnet 40 which receives in a central opening, sleeve assembly 12. A cupshaped cover 42 encloses and protects electromagnet 40 and extends down to plug-in body 30. Cover 42 has a central opening for receiving therein an upper threaded portion 12*e* of sleeve section 12*b*. Cover 42 is secured in place by a nut 43. Cover 42 as well as armature 20, pole piece 21, poppet 23 and body 18 are formed of a high magnetically permeable material (ferromagnetic).

The circuit of magnet flux lines produced by electromagnet 40 when energized may be traced as follows. The flux lines flow down through sleeve section 12*b*, armature 20, and then through air gap 45 (between surfaces 20*e* and 21*d*) to pole piece 21. The flow continues through the pole piece, sleeve section 12*d*, body 30 and then through cover 42 with the circuit being completed to section 12*b*. As previously described, sleeve section 12*c* is made of a very low magnetically permeable material and extends substantially above and below air gap 45 so that section 12*c* provides a gap to the flux circuit greater than that of gap 45. Accordingly, the circuit of flux lines is directed and concentrated through air gap 45.

Figure 3:
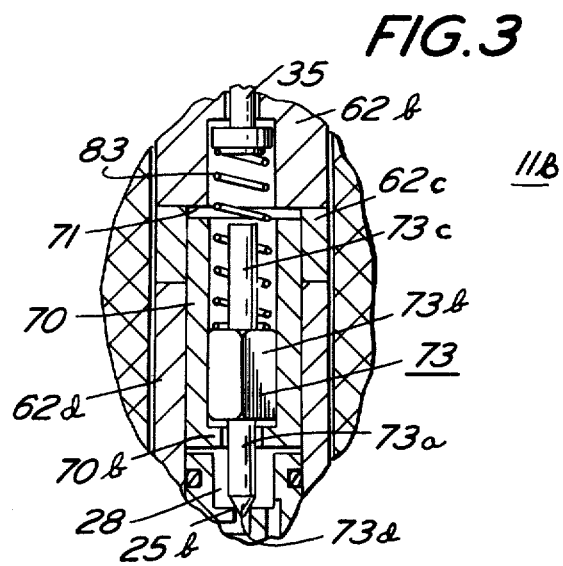
FIG. 3 is a sectional view of a portion of FIG. 2 in which a normally closed first stage is used.

In operation of first stage 11, with electromagnet 40 deenergized, the first stage is in its illustrated normally open position (FIG. 2). Upon energization of electromagnet 40, armature 20 is attracted to pole piece 21 thereby compressing bias spring 36. With the bias spring compressed as shown in FIG. 3 range spring 33 is effective to apply a closing force to poppet 23. Thus, poppet valve plug 23d is seated within valve seat orifice 25b for a valve closed state. It will be understood that the spring force of range spring 33 must be greater than the force produced at orifice 25b under poppet 23 by the pressure of the fluid in order that the poppet close the orifice and maintain it closed. Thus orifice 25b is maintained closed by the range spring which has an effective spring force sufficient for the relief function. Specifically, if the force of the fluid at channel 55 and orifice 25b is sufficient to overcome the spring force of range spring 33, then the relief function is provided. If a higher relief pressure is desired or a lower relief pressure is desired, the spring force of spring 33 may be increased or decreased respectively by means of adjusting set screw 37 in the manner previously described.

It will be understood that with first and second stages 11, 11a in a closed state that the pressure in chamber 54 (the pressure under poppet 23) cannot rise above a desired maximum predetermined value determined by the spring force of range spring 33 (as adjusted by set screw 37). Specifically, as the upstream pressure increases, the pressure chamber 54 (defined as an "intermediate pressure") increases until poppet 23 opens. Thus second stage poppet 32 also opens to allow upstream pressure to flow to tank until the upstream pressure (and thus the intermediate pressure) decreases sufficiently.

In use of assembly 10, upstream pressure is applied to a system requiring fluid pressure for work as well as to inlet 14b. With assembly 10 deenergized, upstream pressure is dumped to tank and no work is done. When assembly 10 is energized, upstream pressure is then applied to the system and assembly 10 operates as a relief valve.

More particularly, this operation may be further defined if it is assumed that upstream pressure is at a value which causes first stage 11 to operate at its balance point. Thus first stage 11 is continually leaking to maintain an intermediate pressure in chamber 54. If for example, a pressure spike is generated upstream, that spike moves poppet 32 and opens the second stage orifice. Since flow through pilot 52 is slow, intermediate pressure is always being maintained. Thus the spike is bled off to tank until the balance point of the second stage is again reached and poppet 32 again closes.

In summary, it will be understood that tube 25d having flow passage 57 is rigidly secured to assembly 25. Fluid at intermediate pressure flows through channel 55, then under poppet 23 and then through chamber 28 (above poppet 23) to channel 57. Channel 57 is located adjacent the wall of chamber 28. Flow channel 57 extends through tube 25d so that the fluid from chamber 28 is effectively vented into outlet 14c and tank. It is in this way that the intermediate pressure directly opposes the range spring for the relief function.

Tube 25d is received within chamber 32b and is at least of length to extend over the entire longitudinal length of the second stage chamber 30a. In this manner second stage poppet or plug means 32 is movable longitudinally with respect to tube 25d between the valve open and valve closed position.

Thus it will now be understood that separate flow channels in valve housing 14 are not required since the flow from orifice 25b through chamber 28 and then to outlet 14c is achieved within assembly 10. In this manner, a multiple of valve assemblies 10 may easily be mounted in multiple valve units and valve assembly 10 may be checked out by itself as a total unit.

There has now been described how two stage assembly 10 operates in a normally open manner. However, assembly 10 may also operate as a normally closed two stage valve by using a normally closed first stage 11b having a relief function as shown in FIG. 3. In FIG. 3 plunger 35 may be similarly adjusted by turning screw 37 as in FIG. 2 to vary the spring pressure of a range spring 83 coupled between plunger 35 and a guide portion 73b of a poppet 73. In this manner, a preload is applied so that poppet 73 is closed against a predetermined intermediate pressure applied at orifice 25b. Orifice assembly 25, the second stage elements and the elements of the first stage not shown are identical with valve assembly 11 in FIG. 2.

First stage sleeve sections 62b, d are of very high magnetically permeable material while section 62c is of very low magnetically permeable material. Accordingly, upon energization of electromagnet 40, armature 70 is attracted to surface 71 thereby to pull poppet plug 73d out of orifice 25b.

With valve assembly 11b in its normally closed position, upstream pressure would be applied to a system in the manner previously described. If the resultant intermediate pressure increased beyond a predetermined value then poppet 73 would open thereby to provide the relief function. In this manner, it is range spring 83 which maintains poppet 73 closed and chamber 28 above the poppet is vented to tank in the manner previously described.

What is claimed is:

1. A two stage solenoid operated valve assembly providing a relief function comprising a first and a second orifice for respectively a first and a second of said two stages, first plug means movable between a valve open state and a state seating in and closing said first orifice for controlling fluid flow from said second stage to below said first plug means, second plug means having a longitudinal opening over the length thereof and movable between a valve open state and a state seating in and closing said second orifice for controlling flow of fluid from an inlet to an outlet of said valve assembly, solenoid means for electromagnetically moving said first plug means between said open and closed state for actuating by way of said control of fluid flow said second plug means respectively between said open and closed state, a tubular flow passage separate from said first orifice and in fluid communication with said first stage above said first plug means being received within said longitudinal opening for providing fluid flow from above said first plug means directly into said outlet of said valve assembly, said tubular flow passage having one end rigidly secured with respect to said first stage and having the other end and adjacent surface floating and nonfixed, and range spring means tending to bias said first plug means towards said closed state whereby with said first plug means in said closed state when the force of fluid under said first plug means is sufficient to overcome the resilient force of said range spring means said first plug means opens thereby providing said relief function.

2. The valve assembly of claim 1 in which said tube is at least of length to extend over the entire length of said longitudinal opening of said second plug means.

3. The valve assembly of claim 2 in which said range resilient means tends to bias said first plug means in a direction directly opposing the force of fluid flowing from said second stage through said first orifice under said first plug means.

4. The valve assembly of claim 3 in which there is provided means for adjusting the resilient force of said range spring means thereby to vary to a predetermined value a maximum value of said force of fluid under said first plug means and thus the fluid pressure at said inlet.

5. The valve assembly of claim 4 in which said outlet is in fluid communication with a tank and in which there is provided a chamber above said first plug means and in fluid communication with said first orifice and said flow passage means whereby said chamber is vented to tank through said flow passage means.

6. The valve assembly of claim 5 in which said longitudinal opening is a central chamber formed within said second plug means having a section of reduced inner diameter at one end thereof and means for fluid sealing between said reduced inner diameter section and said tube.

7. The valve assembly of claim 4 in which said first stage is normally open valve assembly having a movable armature with a section for engaging said first plug means, bias spring means tending to bias said armature to engage and move said first plug means to said valve open state, said bias spring means having a greater spring force than said range spring means whereby said bias spring means normally maintains said first plug means in said valve open state.

8. The valve assembly of claim 6 in which said solenoid means is adapted to be energized for providing an electromagnetic attractive force to move said armature in a direction for allowing said range resilient means to bias said first plug means to the valve closed position.

9. The valve assembly of claim 4 in which said first stage is a normally closed valve assembly having a movable armature with a section for engaging said plug means, said range spring means comprising a range spring tending to bias said first plug means to said valve closed state.

10. The valve assembly of claim 9 in which said solenoid means is adapted to be energized for providing an electromagnet attractive force to move said armature to engage said first plug means to move said first plug means to the valve open state.

11. The valve assembly of claim 1 in which said tubular flow passage other end and adjacent surface engages only said second stage plug means and said other end being completely open and located slightly below said second orifice within the reduced pressure of the vena contracta.

* * * * *